United States Patent [19]

Matsuo et al.

[11] Patent Number: 5,784,346
[45] Date of Patent: Jul. 21, 1998

[54] OPTICAL DISK REPRODUCING DEVICE PROVIDED WITH IMPROVED SPINDLE MOTOR CONTROL

[75] Inventors: Kazunori Matsuo; Yoshiya Nonaka; Kiyoshi Furukawa, all of Kawagoe, Japan

[73] Assignee: Pioneer Electronic Corporation, Tokyo, Japan

[21] Appl. No.: 808,152

[22] Filed: Feb. 28, 1997

[30] Foreign Application Priority Data

Feb. 28, 1996 [JP] Japan .................................. 8-067201

[51] Int. Cl.⁶ ........................................................ G11B 7/00
[52] U.S. Cl. ................................................................ 369/50
[58] Field of Search ............................. 369/44.27, 44.25, 369/50, 54, 58, 112

[56] References Cited

U.S. PATENT DOCUMENTS 5,446,711  8/1995  Yamamiya ............................... 369/53
5,701,284  6/1995  Lee ......................................... 369/50

*Primary Examiner*—Nabil Hindi
*Attorney, Agent, or Firm*—Morgan, Lewis & Bockius LLP

[57] ABSTRACT

An optical disk reproducing device has a spindle servo control in which when a focusing error or a tracking error occurs, the spindle control voltage immediately before the error occurred is detected and stored in a memory. During the spindle servo is being off, the spindle control voltage is retrieved from the memory and applied to the spindle motor. Because the spindle motor is rotating at a speed corresponding to the track now being traced during the spindle servo off period, the spindle servo can be established quickly.

10 Claims, 3 Drawing Sheets

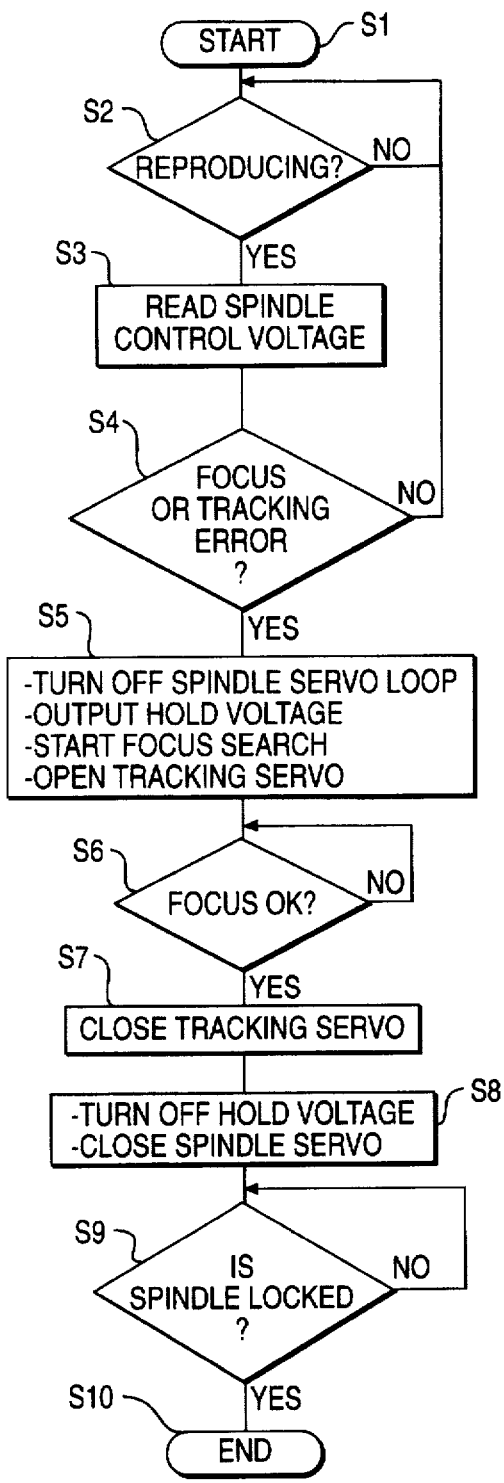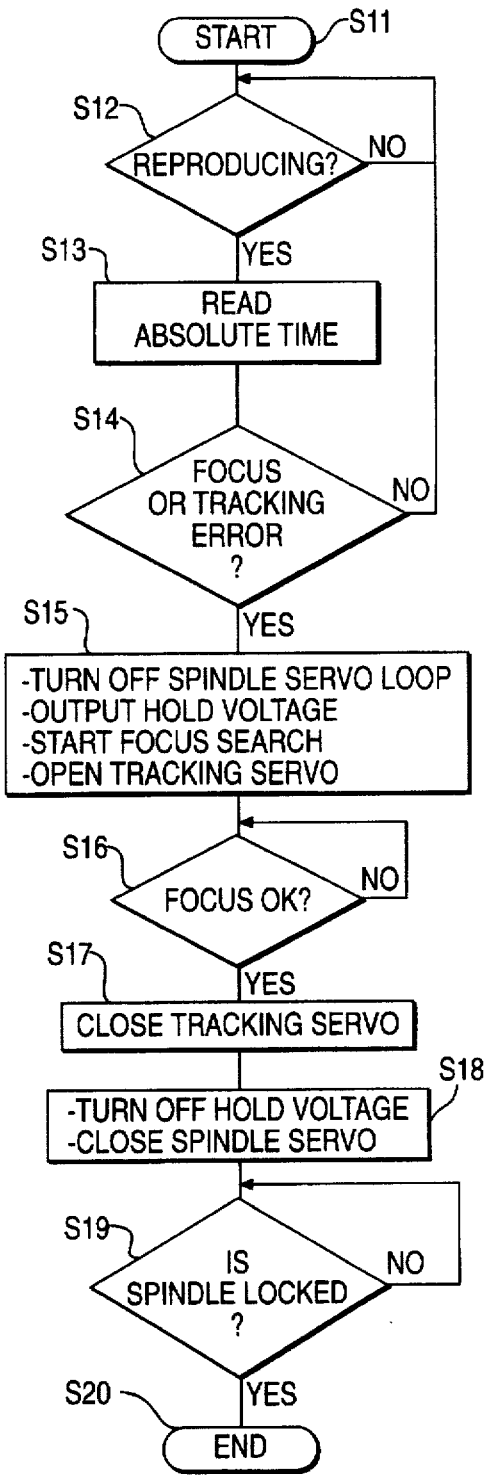
*FIG. 4(A)*  *FIG. 4(B)*

OPTICAL DISK REPRODUCING DEVICE PROVIDED WITH IMPROVED SPINDLE MOTOR CONTROL

This application claims the benefit of Japanese Patent Application No. 8-67201 filed Feb. 28, 1996, which is hereby incorporated by reference.

BACKGROUND OF THE INVENTION

1. Field of the Invention

The present invention relates to an optical disk reproducing device, and more particularly, to an official disk reproducing device provided with an improved spindle motor control. Although the present invention is suitable for a wide scope of applications, it is particularly suitable for reducing the time to restore reading of data when a focusing or tracking servo error occurs.

2. Description of the Related Art

Optical disk reproducing devices for reproducing optical disks, such as CDs (compact disks), LDs (laser disks), and MDs (mini disks), have a servo control status detecting capability of focusing and tracking servo controls. When the device is incapable of reproducing the optical disk due to the focusing or tracking error, for example, by smudges or scratches of the disk or vibrations of the system, the microprocessor learns the status based on the servo control status detected. When the microprocessor determines that the focusing or tracking error occurs, the outputs from the respective servo controls are temporarily rendered OFF. The focus controller implements the focus search and closes the focusing loop at a predetermined position. After the focusing loop is closed, the tracking controller closes the tracking servo loop.

During the above-described processing, a hold voltage output from a spindle controller controls the spindle motor to constantly rotate it at a predetermined speed. The hold voltage is a spindle control voltage signal set in advance by a microprocessor to correspond to a predetermined number of rotations of the spindle motor.

FIGS. 1A through 1D are various conventional servo control signals illustrated for the description of the above-described controls. FIG. 1A shows a focusing or tracking error detection signal; FIG. 1B, a spindle control signal; FIG. 1C, a focus control signal; and FIG. 1D a tracking control signal. The waveforms of the latter three signals are depicted in timed relation with the focusing or tracking error detection signal shown in FIG. 1A.

The hold voltage shown in FIG. 1B is set to correspond to the spindle voltage used in an inner track of the disk. The spindle control has been carried out with the spindle control signal represented by the reproducing voltage indicated in FIG. 1B until the focusing or tracking error detection signal is generated. When the focusing or tracking error detection signal as shown in FIG. 1A is generated, the spindle motor is driven with the hold voltage shown in FIG. 1B so that the spindle motor rotates at a predetermined speed.

When the focus search as shown in FIG. 1C is performed and the focus control signal is locked at a predetermined focusing position to close the focusing loop, the tracking control signal shown in FIG. 1D is locked to close the tracking servo loop. Thereafter, the spindle servo is rendered ON. The spindle motor is braked for a duration of time t by an opposite polarity voltage applied to the spindle motor. Thus, the rotational speed of the spindle motor set to the speed of the inner track is changed to the speed of the track currently being traced where the spindle lock is performed.

When the focusing, tracking, and spindle controls are complete, the pickup is restored to the position where focusing or tracking error is eliminated.

As described above, when the hold voltage is set to the spindle control voltage in the inner track, the hold voltage rotates the spindle motor at a high speed. When the outer track is being read, the hold voltage is too high to rotate the spindle motor at a speed corresponding to the current track position. As a result, a long period of time is required for reaching the rotational speed of the spindle motor corresponding to the track now being traced. This results in the spindle servo lock delay.

With the optical disk reproducing device having an n-multiplied speed reproducing capability, the difference in the rotational speed of the inner and outer tracks is more significant, so that attaining the spindle lock requires a longer period of time when the focusing or tracking error occurs.

Conventionally, the hold voltage to be output as the spindle control signal when the focusing or tracking error occurs is set to a predetermined constant, so that a long period of time is required for attaining the spindle lock and thus a long period of time is required for restoring the data reading condition.

SUMMARY OF THE INVENTION

The present invention has been made to eliminate the above-described drawbacks in the conventional optical reproducing devices, and accordingly it is an object of the present invention to provide an improved spindle servo control that the time required for the spindle lock is shortened when the focusing or tracking error occurs.

To achieve these and other advantages and in accordance with the purpose of the present invention, as embodied and broadly described, an optical disk reproducing device includes a turntable mounting an optical disk having data to be read, a clamper clamping the optical disk on the turntable, a spindle motor rotating the turntable and having a constant linear velocity, reading means for optically reading the data from the optical disk, focusing error generating means for generating a focusing signal from the data read by the reading means, spindle motor controlling means for controlling the rotational speed of the spindle motor by applying a spindle control voltage to the spindle motor, first error signal detecting means for detecting a level of the focusing signal generated from the focusing error generating means and outputting a first error detection signal, spindle control voltage detecting means for detecting the spindle control voltage applied to the spindle motor, control voltage storage means for storing the spindle control voltage signal detected by spindle control voltage detecting means, wherein the spindle control voltage signal is retrieved from the control voltage storage means and applied to the spindle motor controlling means in response to the first error detection signal generated from the first error signal detecting means so that the rotational speed of the spindle motor is controlled based on the spindle control voltage.

In another aspect of the present invention, an optical disk reproducing device includes tracking error generating means for generating a tracking signal from the data read by the reading means, and second error signal detecting means for detecting a level of the tracking signal generated from the tracking error generating means and outputting a second error detection signal, wherein the spindle control voltage signal is retrieved from the control voltage storage means and applied to the spindle motor controlling means in response to the second error detection signal generated from the second error signal detecting means so that the rotational speed of the spindle motor is controlled based on the spindle control voltage.

In another aspect of the present invention, an optical disk reproducing device includes a turntable for mounting an optical disk thereon, data being recorded on the optical disk, a clamper for clamping the optical disk onto the turntable, a spindle motor for rotating the turntable, the spindle motor rotating at a rotational speed, reading means for optically reading the data from the optical disk, focusing error generating means for generating a focusing signal from the data read by the reading means, spindle motor controlling means for controlling the rotational speed of the spindle motor by applying a spindle control voltage to the spindle motor, first error signal detecting means for detecting a level of the focusing signal generated from the focusing error generating means and outputting a first error detection signal, positional information extracting means for extracting positional information representing a position of the optical disk from the data read by the reading means, the positional information being recorded along the data on the optical disk, and storage means for storing data regarding a relationship between the positional information and the spindle control voltage. The spindle control voltage corresponding to the positional information extracted when the first error detection signal is generated is selected from the data stored in the storage means and applied to the spindle motor by the spindle motor controlling means.

Preferably, the positional information is reproducing time information of the optical disk.

In another aspect of the present invention, an optical disk reproducing device includes tracking error generating means for generating a tracking signal from the data read by the reading means, and second error signal detecting means for detecting a level of the tracking signal generated from the tracking error generating means and outputting a second error detection signal. The spindle control voltage corresponding to the positional information extracted when the second error detection signal is generated is selected from the data stored in the storage means and applied to the spindle motor by the spindle motor controlling means.

In a further aspect of the present invention, an optical disk reproducing device includes a turntable mounting an optical disk having data to be read, a clamper clamping the optical disk on the turntable, a spindle motor rotating the turntable and having a constant linear velocity, a pickup coupled to the optical disk and reading the data optically from the optical disk, an amplifier coupled to the pickup and amplifying the data read by the pickup, a digital signal processor coupled to the amplifier and generating servo error signals, a microprocessor coupled to the digital signal processor, determining the servo error signals from the digital signal processor and outputting a hold voltage to the digital signal processor, a decoder coupled to the amplifier, the digital signal processor and the microprocessor and decoding the data to provide an output signal, a servo driver amplifier coupled to the digital signal processor, receiving the servo error signals and outputting the hold voltage to drive the spindle motor until a spindle servo being locked.

It is to be understood that both the foregoing general description and the following detailed description are exemplary and explanatory and are intended to provide further explanation of the invention as claimed.

BRIEF DESCRIPTION OF THE DRAWINGS

The particular features and advantages of the invention as well as other objects will become apparent from the following description taken in connection with the accompanying drawings, in which:

FIG. 4A is a flowchart illustrating a servo restoring procedure according to a first embodiment of the present invention; and FIG. 4B is a flowchart illustrating the servo restoring procedure according to a second embodiment of the present invention.

DETAILED DESCRIPTION OF THE PREFERRED EMBODIMENTS

An optical disk reproducing device according to a preferred embodiments of the present invention will be described while referring to the accompanying drawings.

Figure 2:
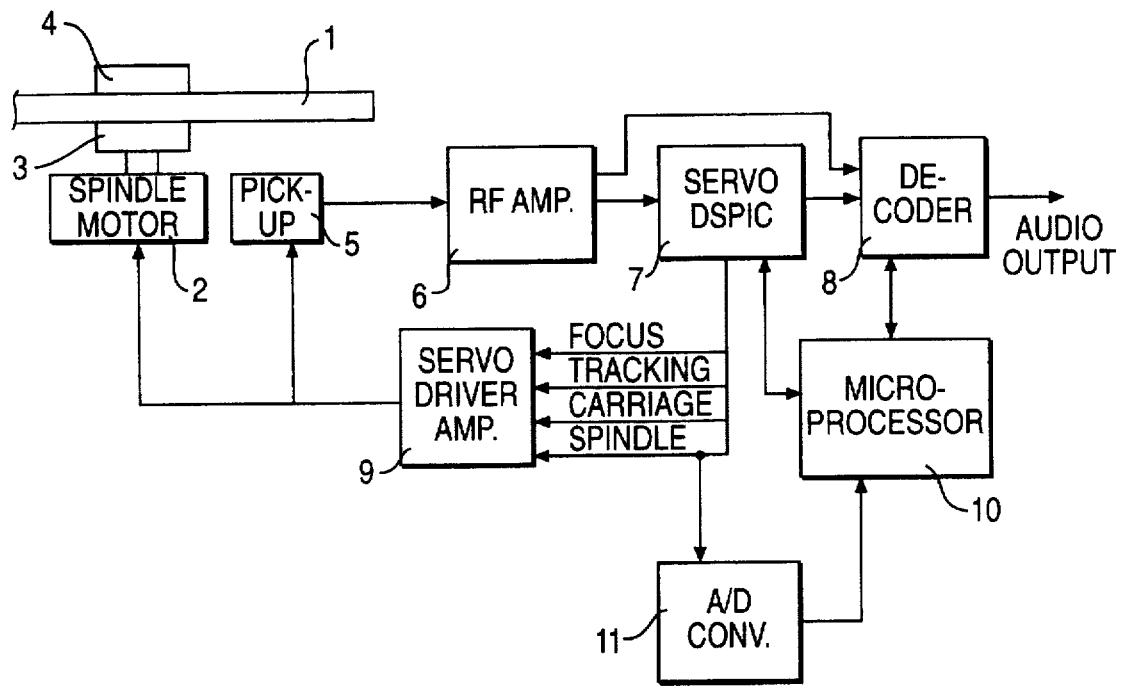
FIG. 2 is a block diagram showing an optical disk reproducing device according to the present invention.

As shown in FIG. 2, an optical disk reproducing device of a first embodiment of the present invention includes an optical disk 1, a spindle motor 2, a turntable 3, a clamper 4, a pickup 5, an RF (radio frequency) amplifier 6, a servo DSP(DIGITAL SIGNAL PROCESSOR)IC 7, a decoder 8, a servo driver amplifier 9, a microprocessor 10, and an A/D (analog-to-digital) converter 11.

The disk 1 is a recording medium such as CD in which audio data is recorded. The clamper 4, which may be of a magnetic type, is provided for clamping the disk 1 onto the turntable 3 so that the disk 1 is rotated together with the turntable 3. The turntable 3 is driven by the spindle motor 2 to rotate at a constant linear velocity. The audio data on the disk 1 is optically read by the pickup 5. The audio data thus read by the pickup 5 is amplified by the RF amplifier 6 and the resultant data is decoded by the decoder 8 to provide an audio output.

The servo DSPIC 7 includes servo error signal generating circuits generating servo error signals including a focusing error signal, a tracking error signal, a carriage error signal, and a spindle error signal. These signals are applied to the respective transducers through the servo driver amplifier 9. The spindle error signal is converted to a digital signal by the A/D converter 11 and the resultant signal is applied to the microprocessor 10.

When the microprocessor 10 determines, based on the output from the servo DSPIC 7, that a focusing or a tracking error occurs, the microprocessor 10 stores the spindle voltage immediately before the error has occurred in a RAM (not shown) in the microprocessor 10 as a spindle control voltage signal. The microprocessor 10 outputs a hold voltage to the servo DSPIC 7 until the spindle servo is locked. Thus, the spindle motor 2 is driven, through the servo driver amplifier 9, with the voltage immediately before the focusing or tracking error has occurred. Although the spindle servo is open during this interval, the change in the number of rotations of the spindle motor 2 is extremely small because the off time duration for focusing or tracking is extremely short. Therefore, the spindle servo can be locked smoothly when the focus is closed and then the tracking is closed.

Figure 3:
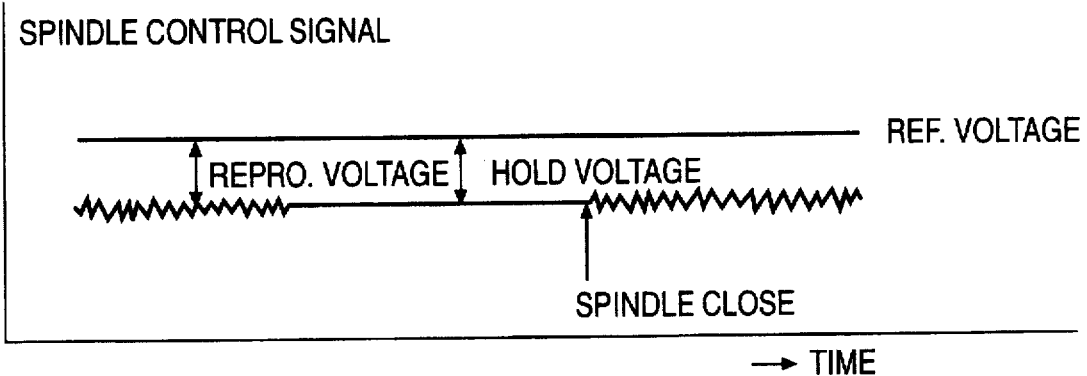
FIG. 3 is an explanatory diagram showing a spindle control signal of the present invention.

FIG. 3 shows the spindle control signal during the process described above. When a focusing or tracking error occurs under a spindle locking condition, a hold voltage is output which is equal to the stored reproducing voltage when the focusing or tracking error occurred, and this hold voltage is maintained until the next spindle is closed. Therefore, the amount of time required for a spindle lock can be shortened because there is no substantial difference in the number of rotations between when the spindle motor is driven with the hold voltage and when the spindle motor is in a locked condition. The reference voltage shown in FIG. 3 may be a ground potential, for example.

Figure 1A:
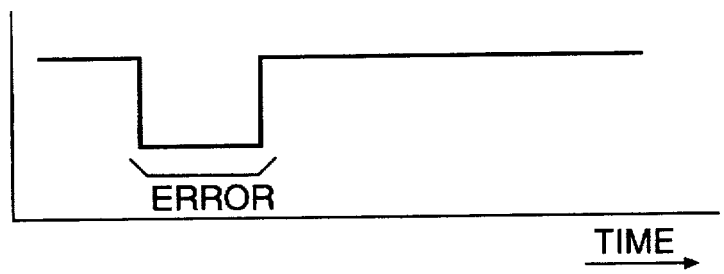
FIGS. 1A through 1D are waveform diagrams of conventional servo control signals.
Figure 1B:
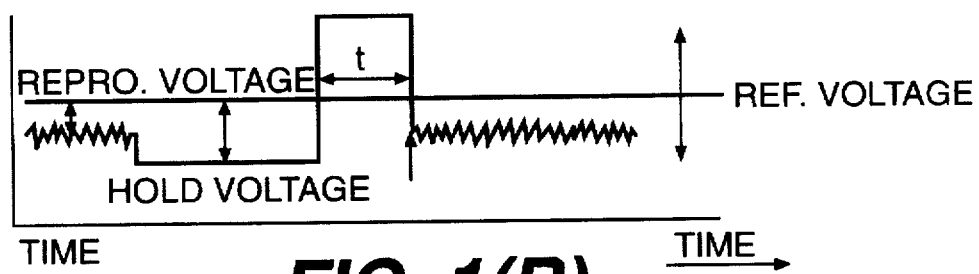
Figure 1C:
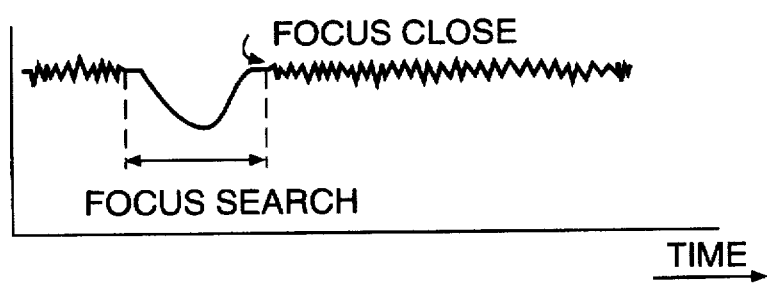
Figure 1D:
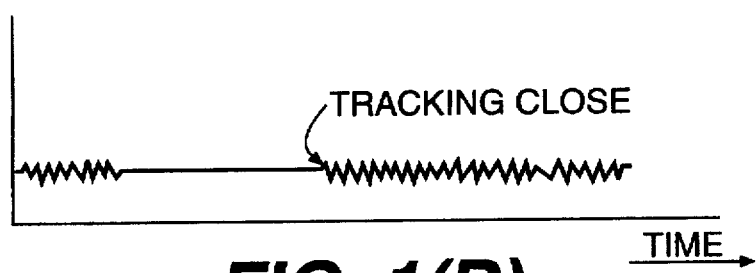

As shown in FIG. 1B, when a focusing or tracking error occurred on outer peripheral tracks in the conventional spindle servo control, a time duration t was required before the spindle locked, because the hold voltage corresponding to the fast rotational speed in the inner tracks is used. However, in the present invention, the time to complete the spindle lock is shortened by the time duration t.

In a second embodiment, the hold voltage set by the microprocessor can be determined based on the absolute time for reproducing (data indicating the reproducing time of a disk is recorded on the CD) rather than the spindle control voltage read in the microprocessor. The microprocessor can learn the absolute time of the currently playing disk from the output of the servo DSPIC 7 and can recognize the position on the disk from the absolute time. The microprocessor 10 sets the servo DSPIC 7 with the hold voltage corresponding to the absolute time by referring to a previously prepared data table containing absolute times and the corresponding hold voltages. This method can be accomplished with the system disclosed in the first embodiment without adding new circuits. However, overall precision of the system may be lower than that of the system using in the A/D converter. The A/D converter and microprocessor of FIG. 2 are shown separately, but an A/D port on the microprocessor can be used directly without separating the A/D converter and the microprocessor.

Flowcharts in FIGS. 4A and 4B show the servo restore procedure when a focusing or tracking error occurs as described above. FIG. 4A employs the method of reading the spindle control voltage, while FIG. 4B shows the method of reading the absolute time.

In step 2 of the flowchart in FIG. 4A, the playing status of the disk is checked. If the CD is playing, the spindle control voltage is read in step 3.

A focusing or tracking error is checked in step 4. If an error is detected, then in step 5 the spindle servo is turned off, the hold voltage is output, a focus search is restarted, and the tracking servo is opened. In step 6, a focus lock is checked. If the focus is locked, then the tracking servo is closed in step 7, and the hold voltage is turned off and the spindle servo is closed in step 8. If a spindle lock is detected in step 9, then the servo restore procedure is complete.

In the flowchart shown in FIG. 4B, the playing status of the disk is checked in step 12. If the CD is playing, the absolute time is read in step 13. Steps 14 through 20 in the flowchart of FIG. 4B are identical to steps 4 through 10 in the flowchart of FIG. 4A. Therefore, a duplicate description will not be repeated here.

The disk reproducing device of the present invention can shorten the time required to restore the reading of recorded data when a focusing or tracking servo error occurs, by controlling the rotations of the spindle based on the spindle control voltage during reproduction.

While only one exemplary embodiment of this invention has been described in detail, those skilled in the art will recognize that there are many possible modifications and variations which may be made in this exemplary embodiment while yet retaining many of the novel features and advantages of the invention. Accordingly, all such modifications and variations are intended to be included within the scope of the appended claims.

What is claimed is:

1. An optical disk reproducing device comprising:

a turntable mounting an optical disk having data to be read;

a clamper clamping the optical disk on the turntable;

a spindle motor rotating the turntable and having a constant linear velocity;

reading means for optically reading the data from the optical disk;

focusing error generating means for generating a focusing signal from the data read by the reading means;

spindle motor controlling means for controlling the rotational speed of the spindle motor by applying a spindle control voltage to the spindle motor;

first error signal detecting means for detecting a level of the focusing signal generated from the focusing error generating means and outputting a first error detection signal;

spindle control voltage detecting means for detecting the spindle control voltage applied to the spindle motor; and control voltage storage means for storing the spindle control voltage signal detected by spindle control voltage detecting means, wherein the spindle control voltage signal is retrieved from the control voltage storage means and applied to the spindle motor controlling means in response to the first error detection signal generated from the first error signal detecting means so that the rotational speed of the spindle motor is controlled based on the spindle control voltage.

2. The device according to claim 1, further comprising:

tracking error generating means for generating a tracking signal from the data read by the reading means; and second error signal detecting means for detecting a level of the tracking signal generated from the tracking error generating means and outputting a second error detection signal, wherein the spindle control voltage signal is retrieved from the control voltage storage means and applied to the spindle motor controlling means in response to the second error detection signal generated from the second error signal detecting means so that the rotational speed of the spindle motor is controlled based on the spindle control voltage.

3. An optical disk reproducing device comprising:

a turntable mounting an optical disk having data to be read;

a clamper clamping the optical disk the turntable;

a spindle motor for rotating the turntable, and having a constant linear velocity;

reading means for optically reading the data from the optical disk;

focusing error generating means for generating a focusing signal from the data read by the reading means;

spindle motor controlling means for controlling the rotational speed of the spindle motor by applying a spindle control voltage to the spindle motor;

first error signal detecting means for detecting a level of the focusing signal generated from the focusing error generating means and outputting a first error detection signal;

positional information extracting means for extracting positional information representing a position of the optical disk from the data read by the reading means, the positional information being recorded along the data on the optical disk; and storage means for storing data regarding a relationship between the positional information and the spindle control voltage, wherein the spindle control voltage corresponding to the positional information extracted when the first error detection signal is generated is selected from the data stored in the storage means and applied to the spindle motor by the spindle motor controlling means.

4. The device according to claim 3, wherein the positional information is reproducing time information of the optical disk.

5. The device according to claim 3, further comprising:

tracking error generating means for generating a tracking signal from the data read by the reading means; and second error signal detecting means for detecting a level of the tracking signal generated from the tracking error generating means and outputting a second error detection signal, wherein the spindle control voltage corresponding to the positional information extracted when the second error detection signal is generated is selected from the data stored in the storage means and applied to the spindle motor by the spindle motor controlling means.

6. An optical disk reproducing device comprising:

a turntable mounting an optical disk having data to be read;

a clamper clamping the optical disk on the turntable;

a spindle motor rotating the turntable and having a constant linear velocity;

a pickup coupled to the optical disk and reading the data optically from the optical disk;

an amplifier coupled to the pickup and amplifying the data read by the pickup;

a digital signal processor coupled to the amplifier and generating servo error signals;

a microprocessor coupled to the digital signal processor, determining the servo error signals from the digital signal processor and outputting a hold voltage to the digital signal processor;

a decoder coupled to the amplifier, the digital signal processor and the microprocessor and decoding the data to provide an output signal; and a servo driver amplifier coupled to the digital signal processor, receiving the servo error signals and outputting the hold voltage to drive the spindle motor until a spindle servo being locked.

7. The device according to claim 6, wherein the hold voltage includes a spindle control voltage immediately before the servo error signal is generated at the digital signal processor.

8. The device according to claim 6, wherein the hold voltage is set by a relationship from the absolute time corresponding to a position on the disk.

9. The device according to claim 6, wherein the servo error signals includes a focusing error signal, a tracking error signal, a carriage error signal, and a spindle error signal.

10. The device according to claim 9, wherein the spindle error signal is converted to a digital signal by an A/D converter coupled to the microprocessor.

* * * * *